(12) United States Patent
McKenna (10) Patent No.: US 8,074,461 B2
(45) Date of Patent: Dec. 13, 2011

(54) PRE-COOLING SYSTEM FOR AN AIR CONDITIONING CONDENSER

(75) Inventor: Larry D. McKenna, Dallas, TX (US)

(73) Assignee: Greenway Design Group, Inc., Huntington Beach, CA (US)

(*) Notice: Subject to any disclaimer, the term of this patent is extended or adjusted under 35 U.S.C. 154(b) by 642 days.

(21) Appl. No.: 12/255,834

(22) Filed: Oct. 22, 2008

(65) Prior Publication Data

US 2010/0095699 A1    Apr. 22, 2010

Related U.S. Application Data

(63) Continuation of application No. 11/707,230, filed on Feb. 15, 2007, now abandoned, which is a continuation of application No. 10/765,369, filed on Jan. 27, 2004.

(51) Int. Cl.
*F25B 39/04* (2006.01)
(52) U.S. Cl. ............................................. 62/183; 62/305
(58) Field of Classification Search ................... 62/181, 62/183, 305, 506
See application file for complete search history.

(56) References Cited

U.S. PATENT DOCUMENTS

| | | | |
|---|---|---|---|
| 2,121,115 A | 6/1938 | Bergdoll |
| 3,770,242 A | 11/1973 | O'Connor, Jr. |
| 3,783,768 A | 1/1974 | Caming et al. |
| 4,028,906 A | 6/1977 | Gingold et al. |
| 4,170,117 A | 10/1979 | Faxon |
| 4,213,306 A | 7/1980 | Peabody et al. |
| 4,240,265 A | 12/1980 | Faxon |
| 4,266,406 A | 5/1981 | Ellis |
| 4,273,733 A | 6/1981 | Kals |
| 4,274,266 A | 6/1981 | Shires |
| 4,290,274 A | 9/1981 | Essex |
| 4,392,959 A | 7/1983 | Coillet |
| 4,542,627 A | 9/1985 | Welker |
| 4,610,197 A | 9/1986 | Van Becelaere |
| 4,655,122 A | 4/1987 | McCabe |
| 4,974,422 A | 12/1990 | Kocher |
| 5,117,644 A | 6/1992 | Fought |
| 5,285,651 A | 2/1994 | Marine |
| 5,311,747 A | 5/1994 | Pringle et al. |
| 5,482,211 A | 1/1996 | Chao et al. |
| 5,605,052 A | 2/1997 | Middleton et al. |
| 6,096,197 A | 8/2000 | Hughes |
| 6,105,376 A | 8/2000 | Stewart et al. |
| 6,314,932 B1 | 11/2001 | Kallina |
| 6,438,977 B1 | 8/2002 | McKay |
| 6,892,552 B2 * | 5/2005 | Richman et al. ................ 62/305 |

FOREIGN PATENT DOCUMENTS

GB      2046194      11/1980

* cited by examiner

*Primary Examiner* — Melvin Jones
(74) *Attorney, Agent, or Firm* — Steina Brunda Garred & Brucker (57) ABSTRACT

A pre-cooling system for use with a condenser of an air conditioning system is provided. In one embodiment, the pre-cooling system comprises a housing that is coupleable to a top of a condenser of an air conditioner wherein the condenser has a substantially-vertical exhaust. The pre-cooling system further comprises a valve mounted in the housing that is coupleable to a water source and wherein the valve is capable of operating independent of electrical power. The pre-cooling system further comprises a vane that is coupled to the valve and positionable in the substantially-vertical exhaust, wherein the vane has an aerodynamically-shaped cross section useable to operate the valve. The present invention further provides a method of manufacturing the pre-cooling system.

20 Claims, 6 Drawing Sheets

PRE-COOLING SYSTEM FOR AN AIR CONDITIONING CONDENSER

The present application is a continuation of U.S. patent application Ser No. 11/707,230 entitled PRE-COOLING SYSTEM FOR AN AIR CONDITIONING CONDENSER filed Feb. 15, 2007 now abandoned, which is a continuation of U.S. patent application Ser. No. 10/765,369 entitled PRE-COOLING SYSTEM FOR AN AIR CONDITIONING CONDENSER filed Jan. 27, 2004, the entirety of the disclosures of which are expressly incorporated herein by reference.

TECHNICAL FIELD OF THE INVENTION

The present invention is directed, in general, to air conditioning systems and, more specifically, to a pre-cooling system for an external air conditioner condenser.

BACKGROUND OF THE INVENTION

Air conditioner condenser units have evolved since early units that generally were horizontal air flow, i.e., air discharge is substantially parallel to the ground or unit base, to the more modern condensers with side air inlet and vertical air discharge. Meanwhile, the concept of spraying a mist of cool water on or around external condenser units of air conditioners in order to improve their efficiency has been. Several patents have been issued disclosing various details of and improvements to this technology, some of which are limited by the assumption of a horizontal flow condenser or a vertical flow condenser as will be detailed below.

One early system discloses a water reservoir that resides below the condenser coils with the water drawn from the reservoir and pumped upward to be sprayed onto the condenser and then running down into the reservoir. Thus, a pool of water is constantly in evidence below the condenser, and is a prime breeding ground for mosquitoes and algae. Other systems disclose the use of a compressor relay that is electrically connected to a compressor and a water valve. The compressor relay is activated by electrical power to the compressor. The use of an electrical switch to operate an electrical valve adds needless cost and complexity to the system. Additionally, this system requires at least a minimal knowledge of electricity for the installer because the compressor electrical circuit must be tapped in order to activate the water valve. Installation of the device by a property owner would be impractical for most non-skilled persons due to a general respect for or fear of electricity.

Other systems have employed a paddle switch or paddle valve that is activated by airflow created when the fan for the condenser is running. However, certain problems have been found with these units. One device describes a horizontal air flow condenser with an airflow-operated paddle valve assembly conventionally fixed to the air conditioner housing in the path of the horizontally-exhausted air stream. In this case, the paddle pivots on a horizontal pin under the force of horizontal air from the unit fan, thereby overcoming a spring pressure exerted on the paddle to keep the valve normally-closed. No details of the paddle is made, so it is likely that the shape is common, such as: rectangular, circular, or perhaps paddle-shaped, e.g., as in a ping pong paddle. Another device describes a substantially-circular flat plate, that is designed to be lifted by a vertical current of air when the condenser fan is operating. The description does not make it clear what minimum force must be exerted by the vertical exhaust to move the flat plate and operate the valve. Attempts by the present inventor to use a substantially-circular paddle with current vertical discharge condenser units was met with substantial failure. The plain paddle could not be made to operate a suitable valve.

Another device describes a pneumatically operated paddle that operates a pinch valve inexpensively constructed of polyvinylchloride, more commonly know as PVC, and flexible tubing. It would appear obvious to one of skill in the art that repeated pinching of the tube as the system operates will seriously shorten the life of the tubing.

Another system requires a temperature sensor for activating the water mist when the temperature in the condenser reaches a predetermined point. This is an unnecessary complication of the system. Other systems employ one or more of: a vibration transducer, battery backup power, temperature sensing bellows, etc., and unnecessarily complicate the system.

Accordingly, what is needed in the art is a condenser pre-cooling system that provides the advantages of previous systems but that does not suffer from the deficiencies of the prior art.

SUMMARY OF THE INVENTION

To address the above-discussed deficiencies of the prior art, the present invention provides a pre-cooling system for use with a condenser of an air conditioning system. In one embodiments the pre-cooling system comprises a housing that is coupleable to a top of a condenser of an air conditioner wherein the condenser has a substantially-vertical exhaust. The pre-cooling system further comprises a valve mounted in the housing that is coupleable to a water source and wherein the valve is capable of operating independent of electrical power. The pre-cooling system further comprises a vane that is coupled to the valve and positionable in the substantially-vertical exhaust, wherein the vane has an aerodynamically-shaped cross section useable to operate the valve. The present invention further provides a method of manufacturing the pre-cooling system.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
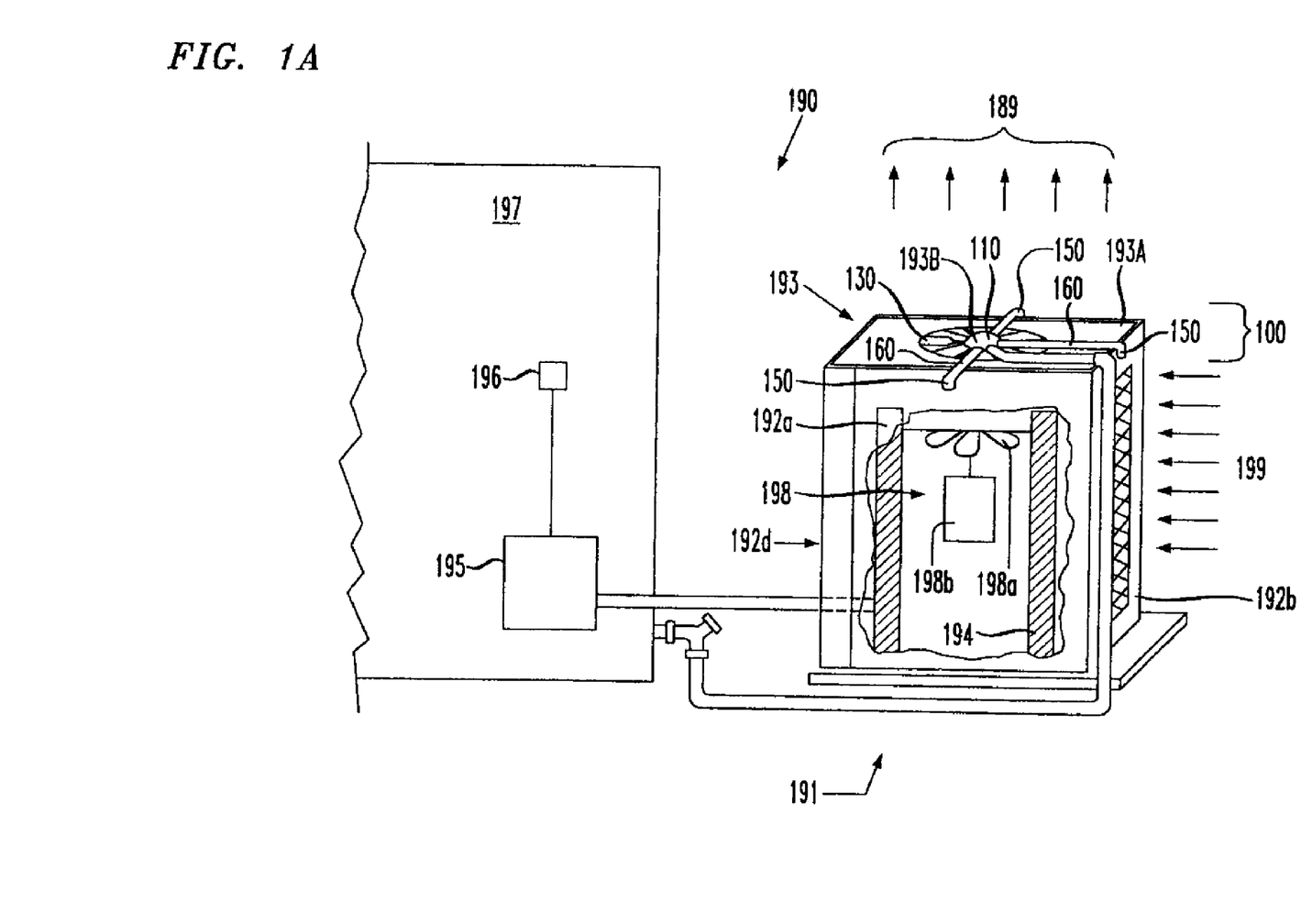
FIG. 1A illustrates a partial sectional, elevation view of one embodiment of a pre-cooling system constructed according to the principles of the present invention for use with a vertical exhaust air conditioning condenser system.

Referring initially to FIG. 1A, illustrated is a partial sectional, elevation view of one embodiment of a pre-cooling system 100 constructed according to the principles of the present invention for use with a vertical exhaust air conditioning condenser system 190. The vertical exhaust air conditioning system 190 shown is typical of condenser units 191 currently used for residential and commercial applications. The condenser unit 191 typically has two or three open (unblocked) sides 192a-192b, (192c not visible), an open top 193 and a condenser coil 194. A fourth side 192d has mechanical and electrical connections to an evaporator 195 and thermostat 196 located within a cooled environment 197 served by the air conditioner 190. Ambient air 199 to cool the condenser coil 194 is drawn in through the open sides 192a-192c of the condenser unit 191 and exhausted through the top 193 by an electric fan 198 having a plurality of fan blades 198a. A force generated by the electric fan 198 is limited by the power of an electric motor 198b and the design of the fan blades 198a which are generally designed only to move a desired amount of air per unit time through the condenser coil 194. The air 199 passes through the condenser coil 194 and is ejected as exhaust 189 in a substantially-vertical direction. In some condenser applications, the condenser unit 191 may employ fixed grillwork 193a or fixed baffles (not shown) in the exhaust 189 to direct the exhaust in a more structured way and to prevent personnel injury from the rotating fan blades 198a.

Figure 1B:
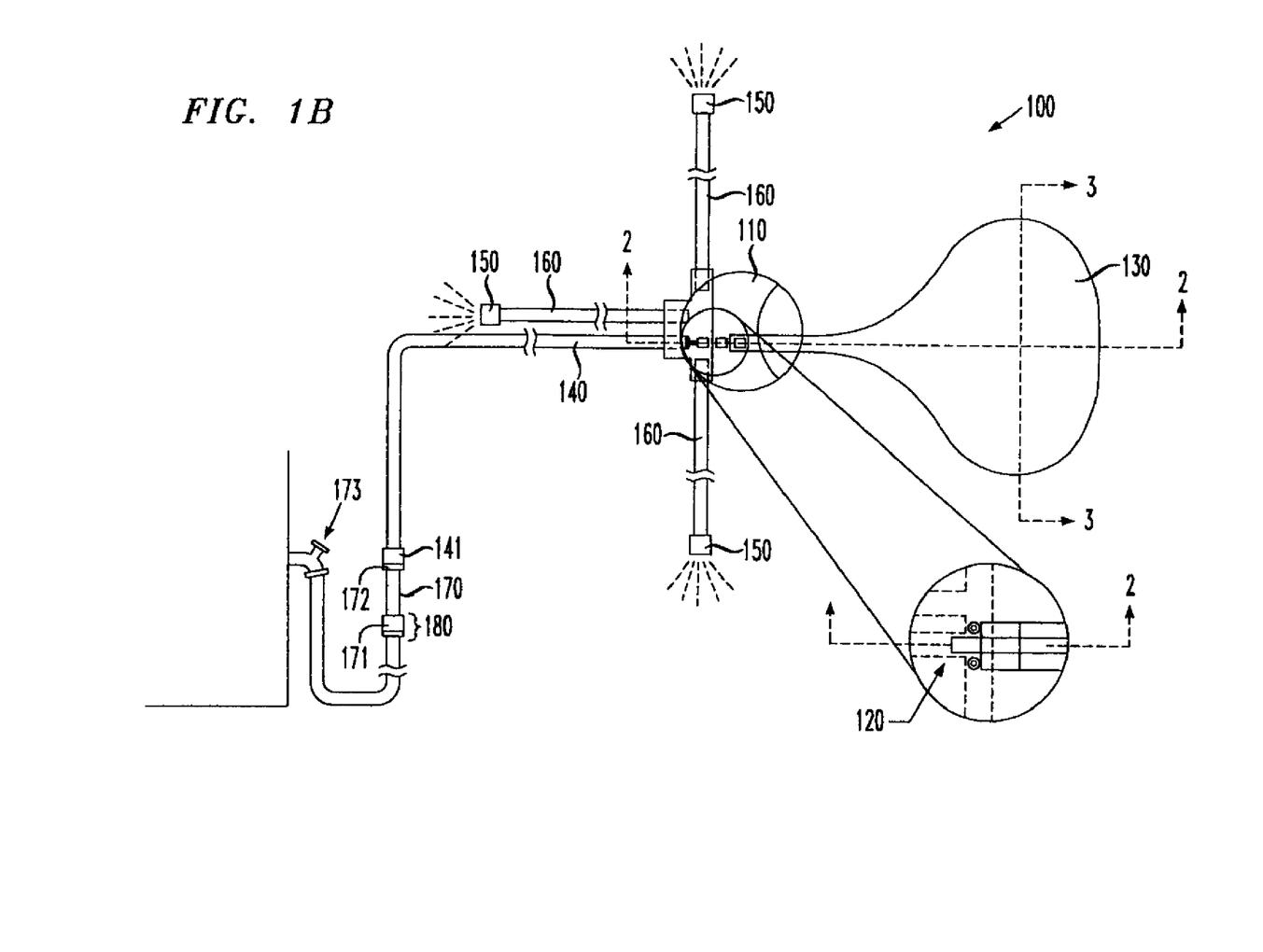
FIG. 1B illustrates a schematic view of one embodiment of a pre-cooling system constructed according to the principles of the present invention

Referring now to FIG. 1B with continuing reference to FIG. 1A, illustrated is a schematic view of one embodiment of a pre-cooling system 100 constructed according to the principles of the present invention. The pre-cooling system 100 comprises: a housing 110, a valve 120, a vane 130, a water supply tube 140, a spray nozzle 150, spray tubing 160, a filter 170, and a hose coupling 180. In a preferred embodiment, the filter 170 comprises an in-line water filter having a nominal 5-micron polyethylene element designed to remove non-dissolved impurities, and additionally hexametaphosphate to treat the water.

Hexametaphosphate is a slow-dissolving, crystalline, food-grade phosphate especially formulated to control corrosion, lime/scale accumulation and iron oxide precipitation in commercial and institutional service water systems. The chemicals used to manufacture hexametaphosphate are listed in the Federal Register No. 227, Nov. 20, 1959, page 9369. Most water supplies produce corrosion, scale, or "red water" problems. Although soft ground water supplies may ensure freedom from scale, they generally present serious corrosion problems. However, with subsurface hard bicarbonate waters corrosion is usually overshadowed by the accumulation of efficiency-robbing lime scale deposits. Freedom from serious corrosion and scaling problems does not guarantee freedom from discolored water, staining or fouling of lines and equipment if the water contains dissolved iron. When used in a water system, hexametaphosphate forms a thin protective phosphate film on all metal surfaces contacted, thereby reducing corrosive action of the water. The film does not build upon itself and cannot interfere with heat transfer. This protective film must be maintained to provide continuous protection. Hexametaphosphate does not remove or reduce hardness in the water, but simply prevents precipitation of the hardness on the surfaces of the equipment. Of course, other suitable filtering materials may also be used.

In one embodiment, the filter 170 is equipped with a ¾" female fitting 171 on the inlet side and a ¾" male fitting 172 on the outlet side. The female fitting 171 is configured to couple to a water source 173 and the male fitting 172 couples to a female hose coupling 141 of the water supply tube 140.

In a preferred embodiment, the housing 110 is formed of a rigid plastic and coupled to the top 193 of the condenser unit 191 with double-sided tape (not shown). Alternatively, the housing 110 may be coupled to the top 193 by any other suitable means, e.g., zip ties, cable ties, safety wire, etc. In the illustrated embodiment, the housing 110 is coupled to the top 193 at a center panel 193b, enabling the vane 130 to be positioned over the grillwork 193a where the exhaust air 189 will exit the condenser unit 191.

Figure 2:
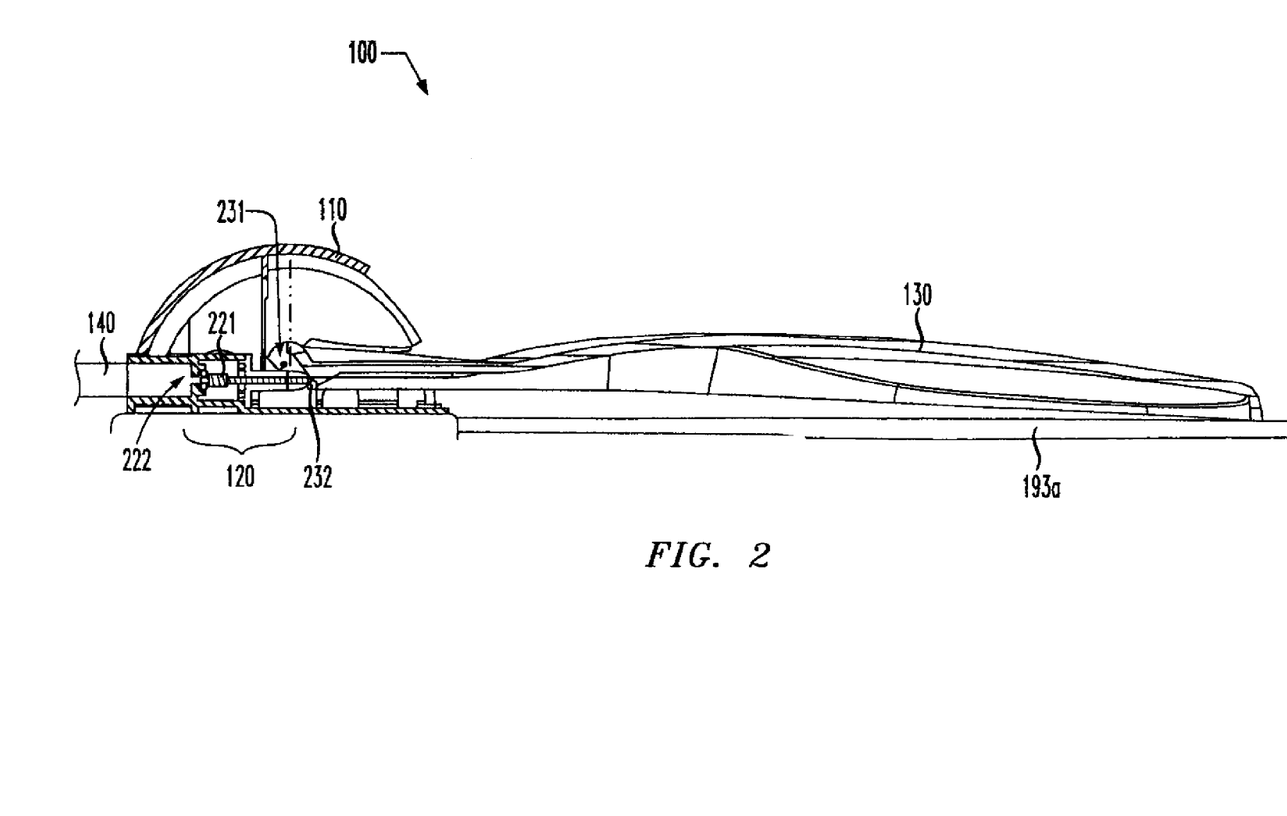
FIG. 2 illustrates a partial sectional view of the valve and the vane of FIG. 1 along plane 2-2 when the fan is not operating.

Referring now to FIG. 2 with continuing reference to FIGS. 1A and 1B, illustrated is a partial sectional view of the valve 120 and the vane 130 of FIG. 1 along plane 2-2 when the fan 198 is not operating. The valve 120 is mounted within the housing 110 and is coupled in fluid communication with the water supply tube 140. The valve 120 is further coupled to and in fluid communication with the spray tubing 160 and the spray nozzle 150. In the illustrated embodiment, the spray tubing 160 is a plurality of sections of spray tubing 160 coupled to and in fluid communication with a like plurality of spray nozzles 150. Of course, the number of spray nozzles 150 may be tailored to the size and orientation of the sides 192a-192c of the condenser unit 191. In a preferred embodiment, the valve 120 is a pin valve 120 having a pin 221 and a seat 222. When the fan 198 is not operating, the vane 130 rests in a down position, not quite on the grillwork 193a, due to gravity. The vane 130 is capable of pivoting at least some amount about axis 231. When the vane 130 is pivoted to the position shown, surface 232 of the vane 130 bears upon and mechanically forces the pin 221 against the seat 222 so that the valve 120 is closed. A rubber O-ring may be located about an end of the pin 221 to seal against the seat 222. With the valve 120 closed when the vane 130 is near, but not on the grillwork 193a, water is prevented from flowing from the water source 173 to the spray tubing 160 and to the spray nozzles 150. Because the valve 120 is mechanically closed, the valve 120 operates independently of any electrical source.

Figure 3:
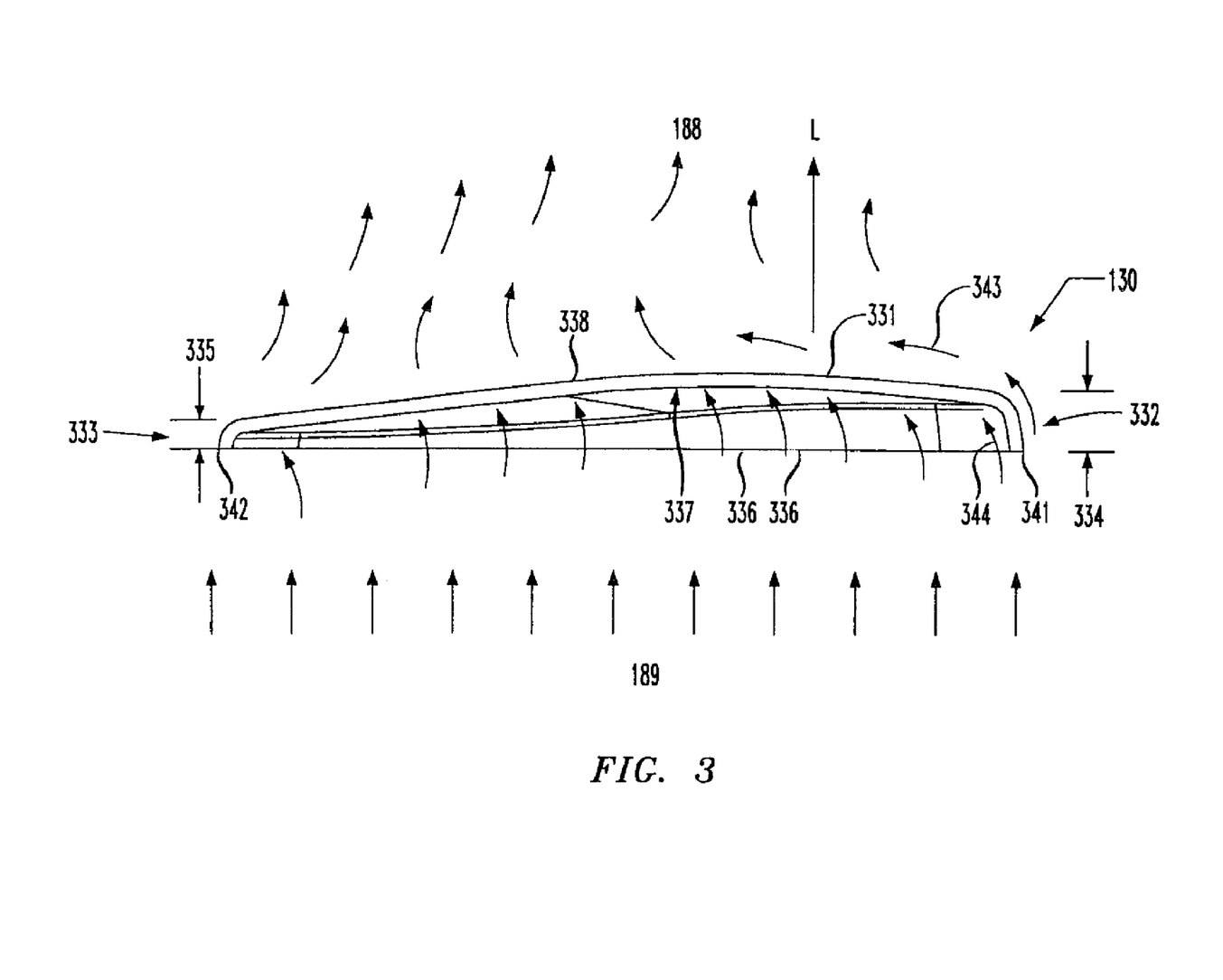
FIG. 3 illustrates a cross sectional view of a portion of the vane of FIG. 1 along the plane 3-3.

Referring now to FIG. 3 with continuing reference to FIGS. 1A, 1, and 2, illustrated is a cross sectional view of a portion of the vane 130 of FIG. 1 along the plane 3-3. The vane 130 has an aerodynamically-shaped cross section 331 having a leading edge 332 and a trailing edge 333. The vane 130 further has a leading edge thickness 334 and a trailing edge thickness 335. As can be seen, the leading edge thickness 334 is substantially thicker than the trailing edge thickness 335. One who is of skill in the art will recognize that the vane 130 has a first point 341 on the leading edge 332 that is furthest from the trailing edge 333. Likewise, the vane 130 has a second point 342 on the trailing edge 333 that is furthest from the leading edge 332. A straight line 336 drawn between the first point 241 and the second point 342 describes a chord 336 of the cross section. Further, the vane 130 has a concave undersurface 337 and an uppersurface 338.

One who is of skill in the art will recognize that the vane 130 is aerodynamically sculpted (e.g., an airfoil) in that the uppersurface 338 is longer than the undersurface 337. In a highly simplified form (a 2-dimensional model for a 3-dimensional problem) for subsonic airflow (such as the vane 130 will experience due to the exhaust 189), the molecules of air passing the leading edge point 341 divide into those molecules flowing over the uppersurface 338 and those molecules flowing along the undersurface 337. The molecules thus divided must rejoin in the free stream air 188 above the vane 130. That is the air that initially strikes the first point 341 divides into a first air flow 343 over the uppersurface 338 and a second air flow 344 under the undersurface 337. As the distance is longer over the uppersurface 338, the air molecules must travel faster in that area than along the undersurface 337. This difference in air molecule velocity creates a difference in air pressure exerted on the undersurface 337 and the uppersurface 338. This effect is described by Bernoulli's Principle, i.e., a lower pressure is evident where fluid motion is faster across a surface. Thus, there is a lower pressure on the uppersurface 338 than on the undersurface 337, giving a net difference in pressure that is the lift L generated by the aerodynamics of the vane 130. With an aerodynamically-shaped cross section 331 formed in the vane 130, the lifting force L created was sufficient to raise the vane 130, and relieve pressure from surface 232 on the pin valve 120 allowing water to flow through the valve 120 to the spray tubing 160 and the spray nozzles 150.

Figure 4:
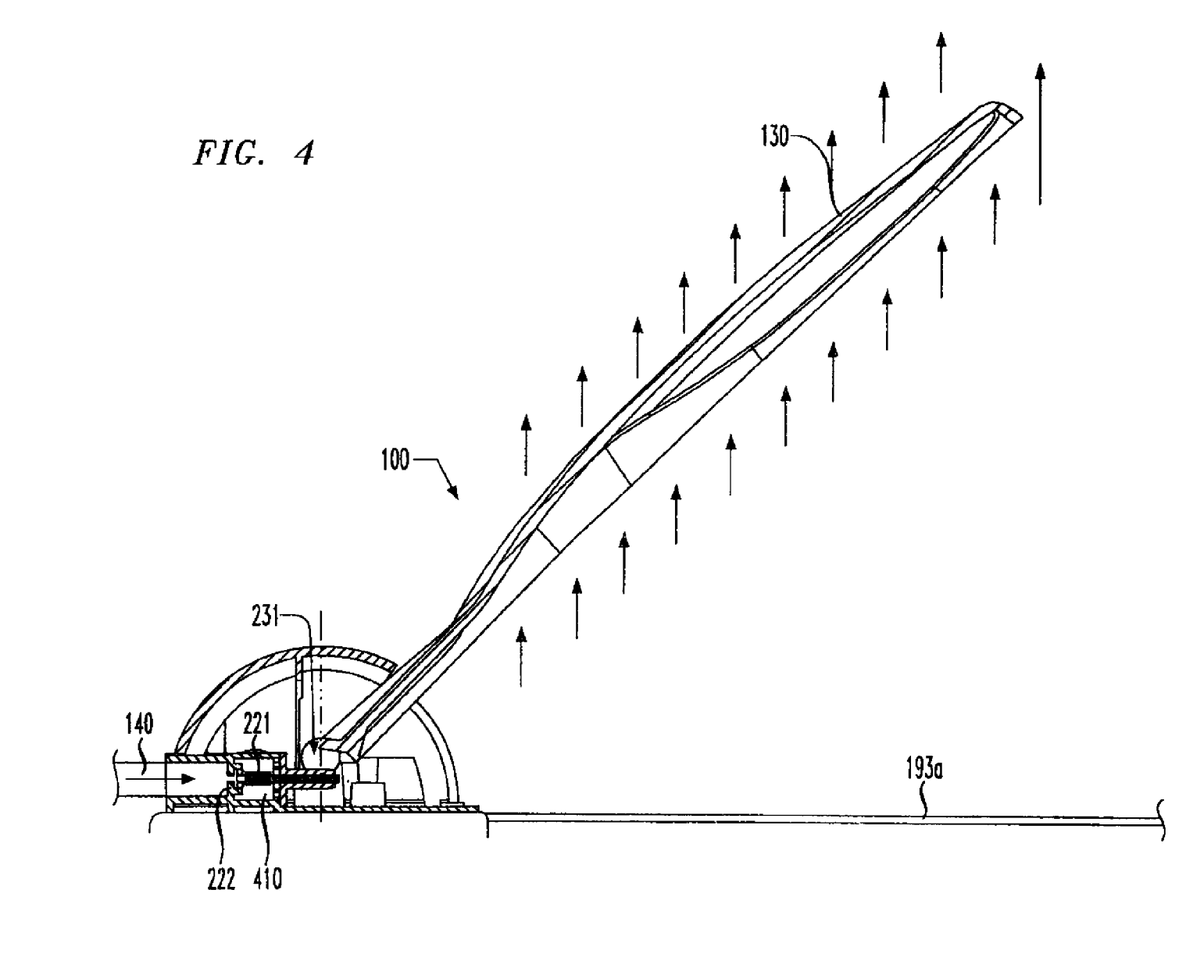
FIG. 4 illustrates a sectional view of the valve and the vane of FIG. 1 along plane 2-2 when the fan is operating.

Referring now to FIG. 4, illustrated is a sectional view of the valve 120 and the vane 130 of FIG. 1 along plane 2-2 when the fan 198 is operating. When the fan 198 is operating, the vane 130 lifts above the grillwork 193a due to aerodynamic lifting as described above. The vane 130 pivots about axis 231 relieving pressure from surface 232 on the pin 221. When the vane 130 is pivoted to the position shown, water pressure in supply tubing 140 acts upon the pin valve and forces the pin 221 away from the seat 222 so that the valve 120 is open. With water pressure on the pin 221 from the supply tubing 140, water flows into a chamber 410. Chamber 410 is in fluid communication with the spray tubing 160 and the spray heads 150. Therefore, water is allowed to flow from the water source 173 to the spray tubing 160 and to the spray nozzles 150. Thus, relieving pressure on the pin 221 allows water pressure to open the valve 120 and is therefore independent of electrical power of any kind.

Figure 5:
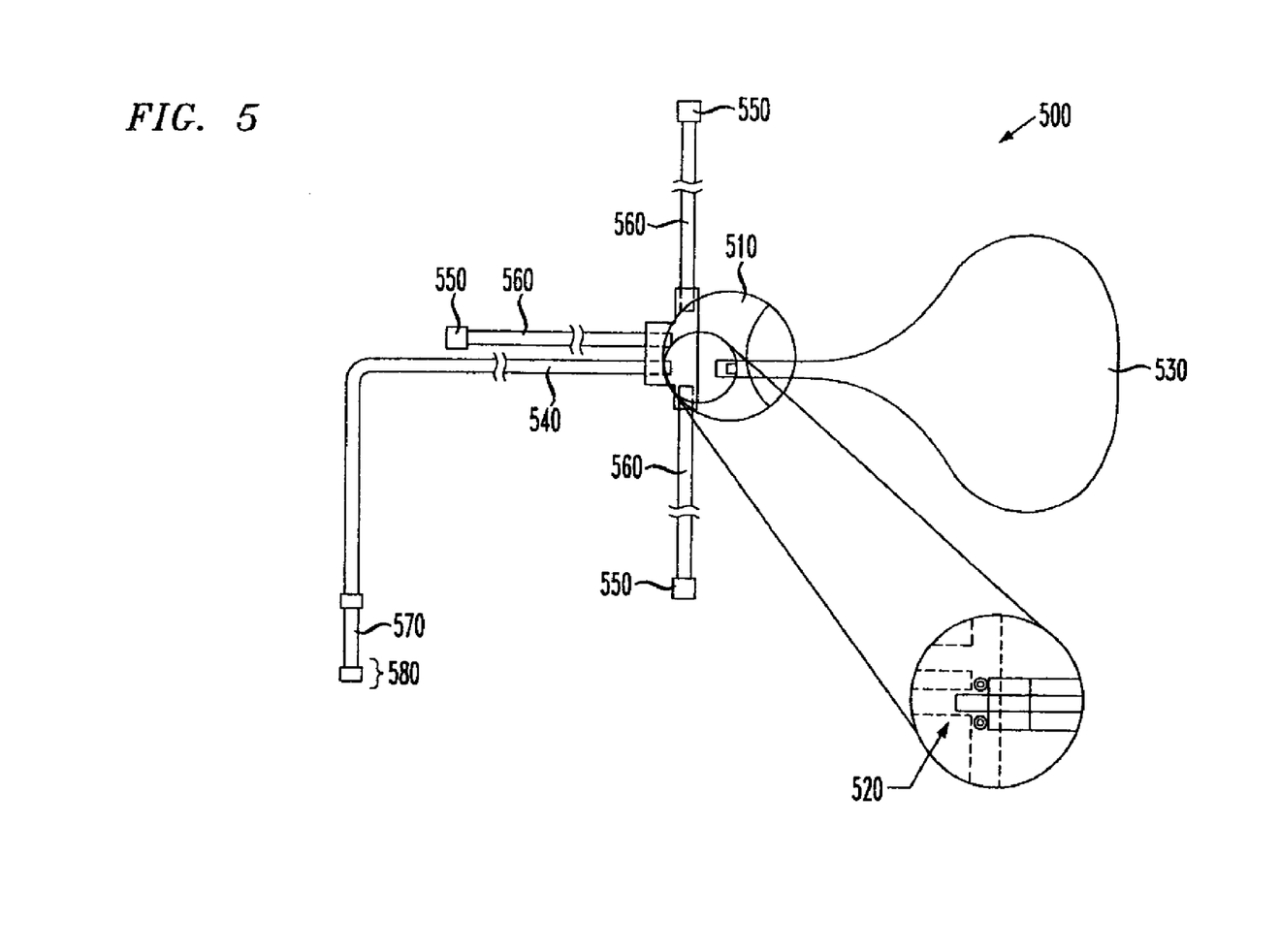
FIG. 5 illustrates a plan view of a pre-cooling system kit for use in retrofitting an existing air conditioning condenser and constructed according to the principles of the present invention.

Referring now to FIG. 5, illustrated is a plan view of a pre-cooling system kit 500 for use in retrofitting an existing air conditioning condenser and constructed according to the principles of the present invention. In one embodiment, the pre-cooling system kit 500 comprises: a housing 510 coupleable to a top of a condenser of an air conditioner, a valve 520 mounted in the housing 510, a vane 530 coupled to the valve 520 and having an aerodynamically-shaped cross section, supply tubing 540 coupleable to the valve 520 and coupleable to a water source, spray nozzles 550, spray tubing 560, a filter 570, and a hose coupling 580. In a preferred embodiment, the pre-cooling system kit 500 is installable on an existing vertical exhaust condenser unit of an air conditioning system. The pre-cooling system kit 500 may further comprise double sided tape and zip ties for installation on the condenser.

Thus, a pre-cooling system, pre-cooling retrofit kit, and a method of manufacturing the same have been described. The pre-cooling system employs an aerodynamically shaped vane that operates to close a water control valve without resorting to electrical connections. Water pressure opens the water control valve when pressure on the pin is relieved. Therefore, the kit is installable by most homeowners without resorting to hiring an electrician. The system has universal application to vertical exhaust condensers for both residential and commercial air conditioning systems.

Although the present invention has been described in detail, those skilled in the art should understand that they can make various changes, substitutions and alterations herein without departing from the spirit and scope of the invention in its broadest form.

What is claimed is:

1. A pre-cooling system for use with a water source and a condenser unit of an air conditioner, the condenser unit producing an exhaust ejected in a substantially vertical direction, the pre-cooling system comprising:
    a housing coupleable to the condenser;
    a valve mounted to the housing and coupleable to the water source, the valve traverseable between an open position for permitting water to flow through the valve and a closed position for preventing water from flowing through the valve;
    an aerodynamic vane defining a pivot end portion with an abutment shoulder, the aerodynamic vane being pivotable about the pivot end portion between a raised position and a down position, the abutment shoulder of the pivot end portion of the aerodynamic vane directly contacting the valve to traverse the valve to the closed position when the aerodynamic vane is pivoted to the down position, the aerodynamic vane disposable within the vertically directed exhaust for creating a drag force, the vane having an uppersurface and an undersurface, the uppersurface having a length longer than the undersurface for creating a lift force in response to the vertically directed exhaust passing over the aerodynamic vane, the lift force characterized by a pressure differential between a first pressure adjacent the uppersurface and a second pressure adjacent the undersurface created in response to exhaust passing over the vane, the first pressure being less than the second pressure, the vane being pivoted toward the raised position to traverse the valve to the open position by the lift force and the drag force when the vertically directed exhaust passes over the vane, the vane being pivoted toward the down position to traverse the valve to the closed position by eliminating the lift force and the drag force when the condenser unit does not produce the vertically directed exhaust.

2. The pre-cooling system as recited in claim 1 wherein said aerodynamic vane defines an aerodynamically-shaped cross section having a leading edge and a trailing edge, said leading edge being substantially thicker than said trailing edge.

3. The pre-cooling system as recited in claim 1 wherein said vane has a concave undersurface.

4. The pre-cooling system as recited in claim 1 further comprising a water supply tube coupled to said valve and coupleable to said water source.

5. The pre-cooling system as recited in claim 1 further comprising a spray nozzle in fluid communication with said valve.

6. The pre-cooling system as recited in claim 1 further comprising spray tubing interposed between said valve and said spray nozzle.

7. The pre-cooling system as recited in claim 1 further comprising a filter coupled to said valve and coupleable to said water source.

8. The pre-cooling system as recited in claim 7 wherein said filter comprises hexametaphosphate.

9. A method of manufacturing a pre-cooling system for a condenser unit of an air conditioner, the condenser unit producing a vertically directed exhaust, said method comprising:
providing a housing coupleable to a top of a condenser unit of an air conditioner;
mounting a valve to the housing, said valve coupleable to a water source, the valve traverseable between an open position and a closed position; and
coupling an aerodynamic vane to said valve with said vane disposable in the exhaust for creating a drag force, the vane defining a pivot end portion with an abutment shoulder, the abutment shoulder in direct contact with the valve to traverse the valve to the closed position, said vane having an uppersurface and an undersurface, the uppersurface having a length longer than the undersurface for creating a lift force in response to the exhaust passing over the vane, the lift force characterized by a pressure differential between a first pressure adjacent the uppersurface and a second pressure adjacent the undersurface created in response to exhaust passing over the vane, the first pressure being less than the second pressure, the vane being pivotable about the pivot end portion between a down position and a raised position, the vane being pivoted toward the raised position by the drag force and the lift force as exhaust passes over the vane, and the vane being pivoted toward the down position by elimination of the drag force and the lift force when the condenser unit does not produce the vertically directed exhaust for contacting the valve with the abutment shoulder to traverse the valve to the closed position.

10. The method as recited in claim 9 wherein coupling an aerodynamic vane includes coupling an aerodynamic vane defining an aerodynamically-shaped cross section having a leading edge and a trailing edge, and wherein said leading edge is substantially thicker than said trailing edge.

11. The method as recited in claim 10 wherein coupling an aerodynamic vane includes coupling an aerodynamic vane wherein a straight line drawn between said leading edge and said trailing edge defines a chord of said aerodynamically-shaped cross section, and wherein said chord and a direction of said substantially-vertical exhaust define an angle of attack of said aerodynamic vane.

12. The method as recited in claim 9 wherein coupling an aerodynamic vane includes coupling an aerodynamic vane having a concave undersurface.

13. The method as recited in claim 9 further comprising coupling a water supply tube to said valve, said water supply tube coupleable to said water source.

14. The method as recited in claim 9 further comprising coupling a spray nozzle in fluid communication with said valve.

15. The method as recited in claim 14 further comprising interposing spray tubing between said valve and said spray nozzle.

16. The method as recited in claim 9 further comprising coupling a filter to said valve, said filter coupleable to said water source.

17. The method as recited in claim 16 wherein interposing a filter includes interposing a filter comprising hexametaphosphate.

18. The system of claim 1 wherein the valve is a pin valve comprising a pin and a seat, the abutment shoulder contacts the pin to force the pin against the seat and prevent fluid flow through the valve, the pin being biased away from the seat of the seat to permit fluid flow through the valve when the aerodynamic vane is pivoted to the raised position.

19. The system of claim 1 wherein the valve comprises an actuator to traverse the valve between the open position and the closed position, and the abutment shoulder contacts the pin to force the pin against the seat and prevent fluid flow through the valve when the vane is in the down position.

20. A pre-cooling system for use with a condenser unit producing an exhaust ejected in a substantially vertical direction, the system connectable to an inlet line of a water source, the pre-cooling system comprising:
a housing coupleable to the condenser;
a valve mounted to the housing and coupleable to the inlet line of the water source, the valve having a seat and a pin, the seat having an aperture which is smaller compared to an inner diameter of the inlet line, the valve traverseable to a closed position wherein the pin is seated upon an inner periphery of the aperture of the seat to prevent fluid flow through the valve and an open position wherein the pin is displaced away from the seat to allow fluid flow through the valve;
an aerodynamic vane defining a pivot end portion with an abutment shoulder, the aerodynamic vane being pivotable between a raised position and a down position about the pivot end portion, the abutment shoulder of the pivot end portion of the aerodynamic vane directly contacting the pin to traverse the valve to the closed position when the aerodynamic vane is pivoted to the down position and overcome a force due to the water pressure of the water source, the aerodynamic vane disposable within the vertically directed exhaust for creating a drag force, the aerodynamic vane having a configuration to generate a lift force in response to the vertically directed exhaust passing over the aerodynamic vane, the vane being pivoted toward the raised position to traverse the valve to the open position by the lift force and the drag force when the vertically directed exhaust passes over the vane, the vane being pivoted toward the down position to traverse the valve to the closed position by eliminating the lift force and the drag force when the condenser unit does not produce the vertically directed exhaust.

* * * * *